United States Patent
Wang

(10) Patent No.: US 12,231,640 B2
(45) Date of Patent: Feb. 18, 2025

(54) VIDEO DECODING METHOD, VIDEO ENCODING METHOD, AND RELATED APPARATUSES

(71) Applicant: TENCENT TECHNOLOGY (SHENZHEN) COMPANY LIMITED, Shenzhen (CN)

(72) Inventor: Liqiang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 64 days.

(21) Appl. No.: 17/958,200

(22) Filed: Sep. 30, 2022

(65) Prior Publication Data

US 2023/0024834 A1 Jan. 26, 2023

Related U.S. Application Data

(63) Continuation of application No. PCT/CN2021/119492, filed on Sep. 22, 2021.

(30) Foreign Application Priority Data

Oct. 16, 2020 (CN) .......................... 202011112822.0

(51) Int. Cl.
*H04N 19/44* (2014.01)
*H04N 19/126* (2014.01)
(Continued)

(52) U.S. Cl.
CPC ......... *H04N 19/126* (2014.11); *H04N 19/176* (2014.11); *H04N 19/44* (2014.11); *H04N 19/91* (2014.11)

(58) Field of Classification Search
CPC .... H04N 19/126; H04N 19/176; H04N 19/44; H04N 19/91
(Continued)

(56) References Cited

U.S. PATENT DOCUMENTS 7,330,509 B2 2/2008 Lu et al.
7,983,496 B2 7/2011 Liu et al.
(Continued)

FOREIGN PATENT DOCUMENTS

CN 104469384 A 3/2015
CN 106797473 A 5/2017
(Continued)

OTHER PUBLICATIONS

Benjamin Bross, Shan Liu, Jianle Chen, Ye-Kui Wang, "Versatile Video Coding (Draft 7)", oint Video Experts Team (JVET) of ITU-T SG 16 WP 3 and ISO/IEC JTC 1/SC 29/WG 11, 16th Meeting: Geneva, CH, Oct. 1-11, 2019 (Year: 2019).*
(Continued)

*Primary Examiner* — Ayman A Abaza
(74) *Attorney, Agent, or Firm* — ANOVA LAW GROUP PLLC

(57) ABSTRACT

A video decoding method includes: performing entropy decoding processing on an encoding block of a video image frame to obtain a quantized coefficient block of residual data corresponding to the encoding block; calculating quantization coefficients in the quantized coefficient block to obtain an implicitly derived index value; determining a transformation mode of the encoding block according to the implicitly derived index value and a value of an index identifier included in the encoding block; and performing inverse transformation processing on an inverse quantization result of the quantized coefficient block based on the transformation mode of the encoding block.

19 Claims, 7 Drawing Sheets

(51) Int. Cl.
*H04N 19/176* (2014.01)
*H04N 19/91* (2014.01)

(58) Field of Classification Search
USPC .................................................. 375/240.03
See application file for complete search history.

(56) References Cited

U.S. PATENT DOCUMENTS

| | | | |
|---|---|---|---|
| 8,085,852 B2 | 12/2011 | Liu et al. | |
| 8,238,442 B2 | 8/2012 | Liu | |
| 8,526,495 B2 | 9/2013 | Liu et al. | |
| 9,049,452 B2 | 6/2015 | Liu et al. | |
| 9,363,511 B2 | 6/2016 | Zhang et al. | |
| 9,769,472 B2 | 9/2017 | Liu et al. | |
| 9,813,737 B2 | 11/2017 | Wang et al. | |
| 10,136,144 B2 | 11/2018 | Liu et al. | |
| 10,205,968 B2 | 2/2019 | Liu et al. | |
| 10,257,521 B2 | 4/2019 | Lee et al. | |
| 10,397,569 B2 | 8/2019 | Liu et al. | |
| 10,455,231 B2 | 10/2019 | Xu et al. | |
| 10,511,834 B2 | 12/2019 | Xu et al. | |
| 10,542,253 B2 | 1/2020 | Liu et al. | |
| 10,567,752 B2 | 2/2020 | Zhao et al. | |
| 10,575,013 B2 | 2/2020 | Liu et al. | |
| 10,582,195 B2 | 3/2020 | Liu et al. | |
| 10,587,881 B2 | 3/2020 | Xu et al. | |
| 10,587,885 B2 | 3/2020 | Ye et al. | |
| 10,595,019 B2 | 3/2020 | Chernyak et al. | |
| 10,609,384 B2 | 3/2020 | Chen et al. | |
| 10,609,402 B2 | 3/2020 | Zhao et al. | |
| 10,609,403 B2 | 3/2020 | Xu et al. | |
| 10,666,968 B2 | 5/2020 | Xu et al. | |
| 10,820,016 B2 | 10/2020 | Lin et al. | |
| 2002/0018597 A1 | 2/2002 | Kajiwara et al. | |
| 2017/0064335 A1 | 3/2017 | Na et al. | |
| 2017/0094271 A1 | 3/2017 | Liu et al. | |
| 2017/0223351 A1 | 8/2017 | Zhang et al. | |
| 2018/0020218 A1 | 1/2018 | Zhao et al. | |
| 2018/0262777 A1 | 9/2018 | Filippov | |
| 2019/0306521 A1 | 10/2019 | Zhao et al. | |
| 2023/0017146 A1* | 1/2023 | Zhang | H04N 19/105 |

FOREIGN PATENT DOCUMENTS

| | | |
|---|---|---|
| CN | 107071450 A | 8/2017 |
| CN | 107483941 A | 12/2017 |
| CN | 109691101 A | 4/2019 |
| CN | 110324619 A | 10/2019 |
| CN | 110519601 A | 11/2019 |
| CN | 111225206 A | 6/2020 |
| CN | 111385584 A | 7/2020 |
| CN | 112533000 A | 3/2021 |
| CN | 112543332 A | 3/2021 |
| CN | 112565749 A | 3/2021 |
| CN | 112565751 A | 3/2021 |
| EP | 3107294 A1 | 12/2016 |
| EP | 3687172 A1 | 7/2020 |
| WO | 2020050651 A1 | 3/2020 |
| WO | 2020050702 A1 | 3/2020 |

OTHER PUBLICATIONS

The World Intellectual Property Organization (WIPO) International Search Report for PCT/CN2021/119492 Dec. 20, 2021 7 Pages (including translation).

Feng Zou et al. "CE10: Test 7.1 Constrained run for Intra String Copy", Oct. 24, 2014, Section 1-3, Joint Collaborative Team on Video Coding (JCT-VC) of ITU-T SG 16 WP 3 and ISO/IEC JTC 1/SC 29/WG 11.

Feng Zou et al. "Non-SCCE4: Constrained run for 1D dictionary coding", Jul. 9, 2014, Section 1-4, Joint Collaborative Team on Video Coding (JCT-VC) of ITU-T SG 16 WP 3 and ISO/IEC JTC 1/SC 29/WG 11.

Benjamin Bross et al. "Versatile Video Coding (Draft 2)" , Jul. 10-18, 2018, ISO/IEC JTC1/SC29/WG11 JVET-K1001.

Benjamin Bross et al. "General Video Coding Technology in Responses to the Joint Call for Proposals on Video Compression with Capability beyond HEVC", 2019, vol. 30, No. 5, IEEE Transactions on Circuits and Systems for Video Technology.

Dong Liu et al. "Deep Learning-Based Technology in Responses to the Joint Call for Proposals on Video Compression with Capability beyond HEVC" 2019, IEEE Transactions on Circuits and Systems for Video Technology.

Han Zhu et al. "Residual convolutional neural network based in-loop filter with intra and inter frames processed respectively for AVS3" Jul. 2020, 2020 IEEE International Conference on Multimedia & Expo Workshops (ICMEW), London, UK.

Shan Liu et al. "Joint Temporal-Spatial Bit Allocation for Video Coding With Dependency", Jan. 2005, vol. 15 No. 1, IEEE Transactions on Circuits and Systems for Video Technology.

Rajan Joshi et al. "High Efficiency Video Coding (HEVC) Screen Content Coding: Draft 4", Jun. 19-26, 2015 , ISO/IEC JTC1/SC29/WG11 JCTVC-U1005. Part 1.

Rajan Joshi et al. "High Efficiency Video Coding (HEVC) Screen Content Coding: Draft 4", Jun. 19-26, 2015 , ISO/IEC JTC1/SC29/WG11 JCTVC-U1005. Part 2.

Rajan Joshi et al. "High Efficiency Video Coding (HEVC) Screen Content Coding: Draft 4", Jun. 19-26, 2015 , ISO/IEC JTC1/SC29/WG11 JCTVC-U1005. Part 3.

Shan Liu et al. "Overview of HEVC extensions on screen content coding", vol. 4. 2015, Cambridge University Press.

Rajan Joshi et al. "Screen content coding test model 1 (SCM 1)" , JCTVC-Q1014, Valencia, Spain.

Xiaozhong Xu et al. "Block vector prediction for intra block copying in HEVC screen content coding", p. 273-282, 2015 Data Compression Conference.

Xiaozhong Xu et al. "Intra block copy in Versatile Video Coding with Reference Sample Memory Reuse" ,2019 Picture Coding Symposium (PCS).

Chun-Chi Chen et al. "Screen Content Coding Using Non-Square Intra Block Copy for HEVC", Jul. 2014, 2014 IEEE International Conference on Multimedia and Expo (ICME), Chengdu, China.

Yingbin Wang et al. "Intra Block Copy in AVS3 Video Coding Standard", Jul. 2020, 2020 IEEE International Conference on Multimedia & Expo Workshops (ICMEW), London, UK.

Shan Liu et al. "Nonlinear motion-compensated interpolation for low-bit-rate video", Applications of Digital Image Processing XXIII 4115, 203-213.

Kimin Zhang et al. "Intra mode coding in HEVC standard", p. 1-6, 2012 Visual Communications and Image Processing.

Shan Liu et al. "Bit-depth scalable coding for high dynamic range video", 2008, vol. 6822. Journal of Visual Communication and Image Representation.

Xiaozhong Xu et al. "Intra Block Copy in HEVC Screen Content Coding Extensions" , vol. 6, Issue 4, p. 409-419, IEEE Journal on Emerging and Selected Topics in Circuits and Systems.

Shan Liu et al. "Hybrid global-local motion compensated frame interpolation for low bit rate video coding", p. 58-76, Journal of Visual Communication and Image Representation 14 (1).

Yanfei Shen et al. "High Efficiency Video Coding.", Nov. 2013, vol. 36 No. 11, Chinese Journal of Computers. China.

China National Intellectual Property Administration (CNIPA) Office Action 1 for 202011112822.0 Jan. 17, 2022 10 Pages (including translation).

European Patent Office European Search Report for Application No. 21879209.1 Aug. 11, 2023 7 pages.

* cited by examiner

VIDEO DECODING METHOD, VIDEO ENCODING METHOD, AND RELATED APPARATUSES

RELATED APPLICATION(S)

This application is a continuation application of PCT Patent Application No. PCT/CN2021/119492 filed on Sep. 22, 2021, which claims priority to Chinese Patent Application No. 202011112822.0, entitled "VIDEO DECODING METHOD AND APPARATUS, COMPUTER-READABLE MEDIUM, AND ELECTRONIC DEVICE" and filed with the China National Intellectual Property Administration on Oct. 16, 2020, all of which are incorporated herein by reference in entirety.

FIELD OF THE TECHNOLOGY

The present disclosure relates to the field of computers and communication technologies, and in particular, to video encoding and decoding.

BACKGROUND

In a video encoding process, an encoder side usually performs transformation, quantization, and entropy coding processing on residual data between original video data and predicted video data before transmitting the residual data to a decoder side. There are also some residuals with weak correlation, which may skip a transformation process.

Due to the diversity of the residual data, a single discrete cosine transform (DCT) transformation kernel cannot adapt to all residual features. Therefore, for a residual block, a plurality of DCT transformation kernels or discrete sine transform (DST) transformation kernels may be selected as transformation matrix combinations.

Although the adaptability of the transformation matrix combinations to the residual block may be improved, the encoding amount of a transformation mode index may be increased, resulting in relatively low encoding efficiency.

SUMMARY

Embodiments of the present disclosure provide a video decoding method and apparatus, a computer-readable medium, and an electronic device, which can effectively improve video encoding efficiency at least to a certain extent.

In one aspect, the present disclosure provides a video decoding method, performed by a computing device, the method including: performing entropy decoding processing on an encoding block of a video image frame to obtain a quantized coefficient block of residual data corresponding to the encoding block; calculating quantization coefficients in the quantized coefficient block to obtain an implicitly derived index value; determining a transformation mode of the encoding block according to the implicitly derived index value and a value of an index identifier included in the encoding block; and performing inverse transformation processing on an inverse quantization result of the quantized coefficient block based on the transformation mode of the encoding block.

In another aspect, the present disclosure provides a video encoding method, performed by a computing device, the method including: performing a difference operation on an original image signal and a predicted image signal corresponding to an encoding block to obtain residual data corresponding to the encoding block; performing transform and quantization processing on the residual data according to a transformation mode corresponding to the encoding block to obtain a quantized coefficient block of the residual data corresponding to the encoding block, where the transformation mode corresponding to the encoding block is determined according to an implicitly derived index value and a value of an index identifier included in the encoding block, and the implicitly derived index value includes a correspondence with a calculation result of quantization coefficients in the quantized coefficient block; and performing entropy coding on the quantization coefficients in the quantized coefficient block to obtain an encoded video bitstream.

In yet another aspect, the present disclosure provides a video decoding apparatus, arranged in a computing device, the apparatus including: a memory storing computer program instructions; and a processor coupled to the memory and configured to execute the computer program instructions and perform: performing entropy decoding processing on an encoding block of a video image frame to obtain a quantized coefficient block of residual data corresponding to the encoding block; calculating quantization coefficients in the quantized coefficient block to obtain an implicitly derived index value; determining a transformation mode of the encoding block according to the implicitly derived index value and a value of an index identifier included in the encoding block; and performing inverse transformation processing on an inverse quantization result of the quantized coefficient block based on the transformation mode of the encoding block.

In yet another aspect, the present disclosure provides a video encoding apparatus, arranged in a computing device, the apparatus including: a memory storing computer program instructions; and a processor coupled to the memory and configured to execute the computer program instructions and perform: performing a difference operation on an original image signal and a predicted image signal corresponding to an encoding block to obtain residual data corresponding to the encoding block; performing transform and quantization processing on the residual data according to a transformation mode corresponding to the encoding block to obtain a quantized coefficient block of the residual data corresponding to the encoding block, wherein the transformation mode corresponding to the encoding block is determined according to an implicitly derived index value and a value of an index identifier included in the encoding block, and the implicitly derived index value includes a correspondence with a calculation result of quantization coefficients in the quantized coefficient block; and performing entropy coding on the quantization coefficients in the quantized coefficient block to obtain an encoded video bitstream.

In yet another aspect, the present disclosure provides a computer-readable medium, storing a computer program, the computer program, when executed by a processor, implementing the video decoding method or the video encoding method according to the embodiments.

In the technical solutions provided in some embodiments of the present disclosure, the quantization coefficients in the quantized coefficient block are calculated to obtain the implicitly derived index value. The transformation mode of the encoding block is determined according to the implicitly derived index value and the value of the index identifier included in the encoding block. The index identifier included in the encoding block is an explicit index identifier, so that the corresponding transformation mode can be indicated based on the implicitly derived index value and the explicit index identifier included in the encoding block. In this way, the encoding amount of the index identifier may be reduced based on indicating more transformation modes, which is beneficial to improve the video encoding efficiency.

The technical solutions of the embodiments of the present disclosure may effectively improve the video encoding efficiency.

It is to be understood that the general descriptions and the following detailed descriptions are merely for illustration and explanation purposes and are not intended to limit the present disclosure.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

In certain embodiments, the term "based on" is employed herein interchangeably with the term "according to."

The described features, structures or characteristics may be combined in one or more embodiments in any appropriate manner. In the following descriptions, a lot of specific details are provided to give a comprehensive understanding of the embodiments of the present disclosure. However, a person skilled in the art is to be aware that, the technical solutions in the present disclosure may be implemented without one or more of the particular details, or another method, unit, apparatus, or step may be used. In other scenarios, well-known methods, apparatuses, implementations, or operations are not shown or described in detail, to avoid obscuring the aspects of the present disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely examples for descriptions, do not need to include all content and operations/steps, and do not need to be performed in the described orders either. For example, some operations/steps may be further divided, while some operations/steps may be combined or partially combined. Therefore, an actual execution order may change.

"Plurality of" mentioned in the present disclosure means two or more. "And/or" describes an association relationship for describing associated objects and represents that three relationships may exist. For example, A and/or B may represent the following three scenarios: only A exists, both A and B exist, and only B exists. The character "/" generally indicates an "or" relationship between the associated objects.

Figure 1:
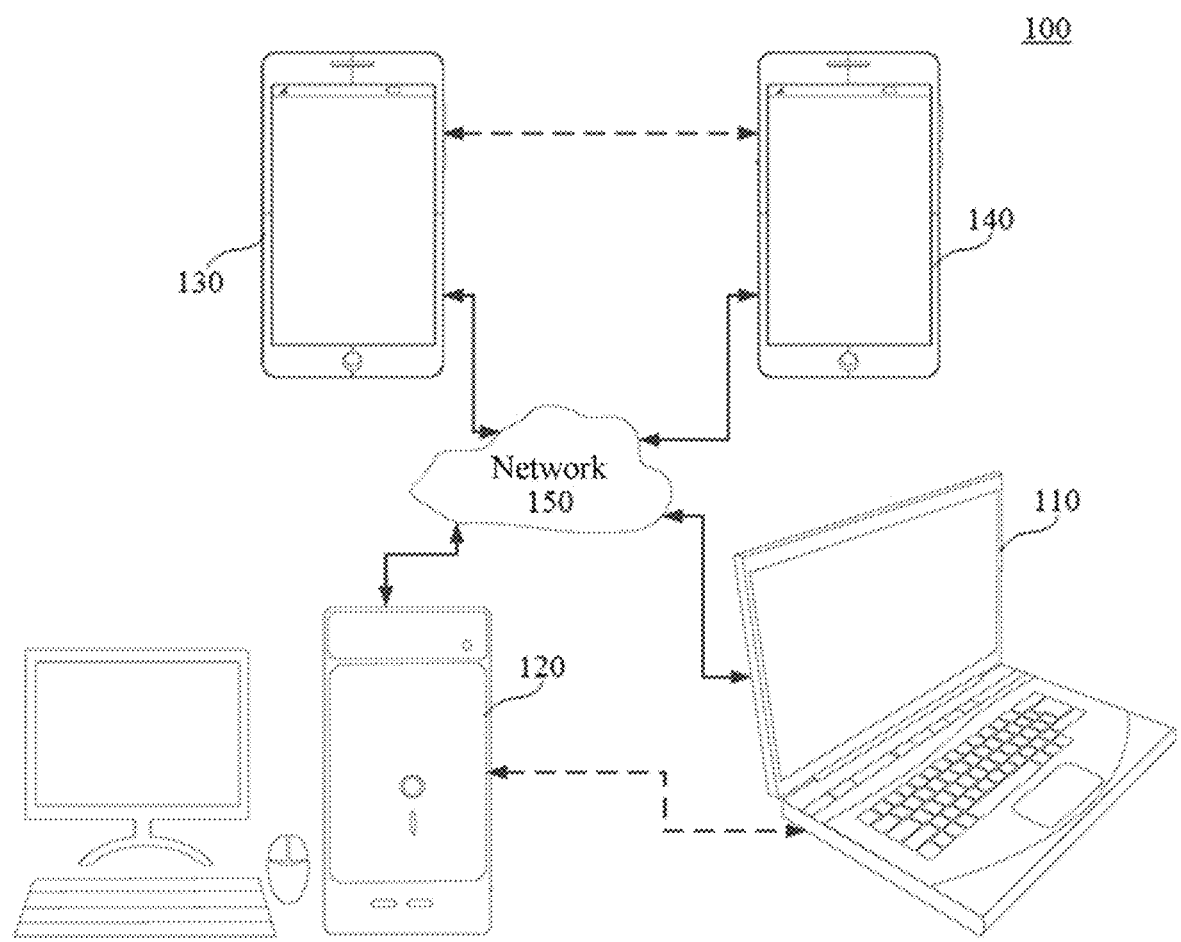
FIG. 1 is a schematic diagram of an exemplary system architecture according to certain embodiment(s) of the present disclosure.

FIG. 1 is a schematic diagram of an exemplary system architecture to which a technical solution according to an embodiment of the present disclosure is applicable.

As shown in FIG. 1, a system architecture 100 includes a plurality of terminal devices. The plurality of terminal devices may communicate with each other through, for example, a network 150. For example, the system architecture 100 may include a first terminal device 110 and a second terminal device 120 that are interconnected by the network 150. In the embodiment in FIG. 1, the first terminal device 110 and the second terminal device 120 perform unidirectional data transmission.

For example, the first terminal device 110 may encode video data (for example, a video and picture stream acquired by the first terminal device 110) to transmit the encoded video data to the second terminal device 120 through the network 150. The encoded video data is transmitted in one or more encoded video bitstreams. The second terminal device 120 may receive the encoded video data from the network 150, decode the encoded video data to restore the video data, and display a video picture according to the restored video data.

In an embodiment of the present disclosure, the system architecture 100 may include a third terminal device 130 and a fourth terminal device 140 that perform bidirectional transmission of the encoded video data. The bidirectional transmission may be performed, for example, during a video conference. For the bidirectional data transmission, each of the third terminal device 130 and the fourth terminal device 140 may encode video data (for example, the video and picture stream acquired by the terminal device) to transmit the encoded video data to an other terminal device of the third terminal device 130 and the fourth terminal device 140 through the network 150. Each of the third terminal device 130 and the fourth terminal device 140 may further receive the encoded video data transmitted by the other of the third terminal device 130 and the fourth terminal device 140, may decode the encoded video data to restore the video data, and may display a video picture on an accessible display apparatus according to the restored video data.

In the embodiment in FIG. 1, the first terminal device 110, the second terminal device 120, the third terminal device 130, and the fourth terminal device 140 may be a server, a personal computer, and a smart phone, but the principles disclosed in the present disclosure may not be limited thereto. Embodiments disclosed in the present disclosure are applicable to a laptop computer, a tablet computer, a media player, and/or a dedicated video conference device. The network 150 represents any quantity of networks including, for example, a wired and/or wireless communication network that transmits the encoded video data between the first terminal device 110, the second terminal device 120, the third terminal device 130, and the fourth terminal device 140. A communication network 150 may exchange data in circuit-switched and/or packet-switched channels. The network may include a telecommunications network, a local area network, a wide area network, and/or the internet. For the objective of the present disclosure, unless explained below, an architecture and a topology of network 150 may be immaterial to the operations disclosed in the present disclosure.

Figure 2:
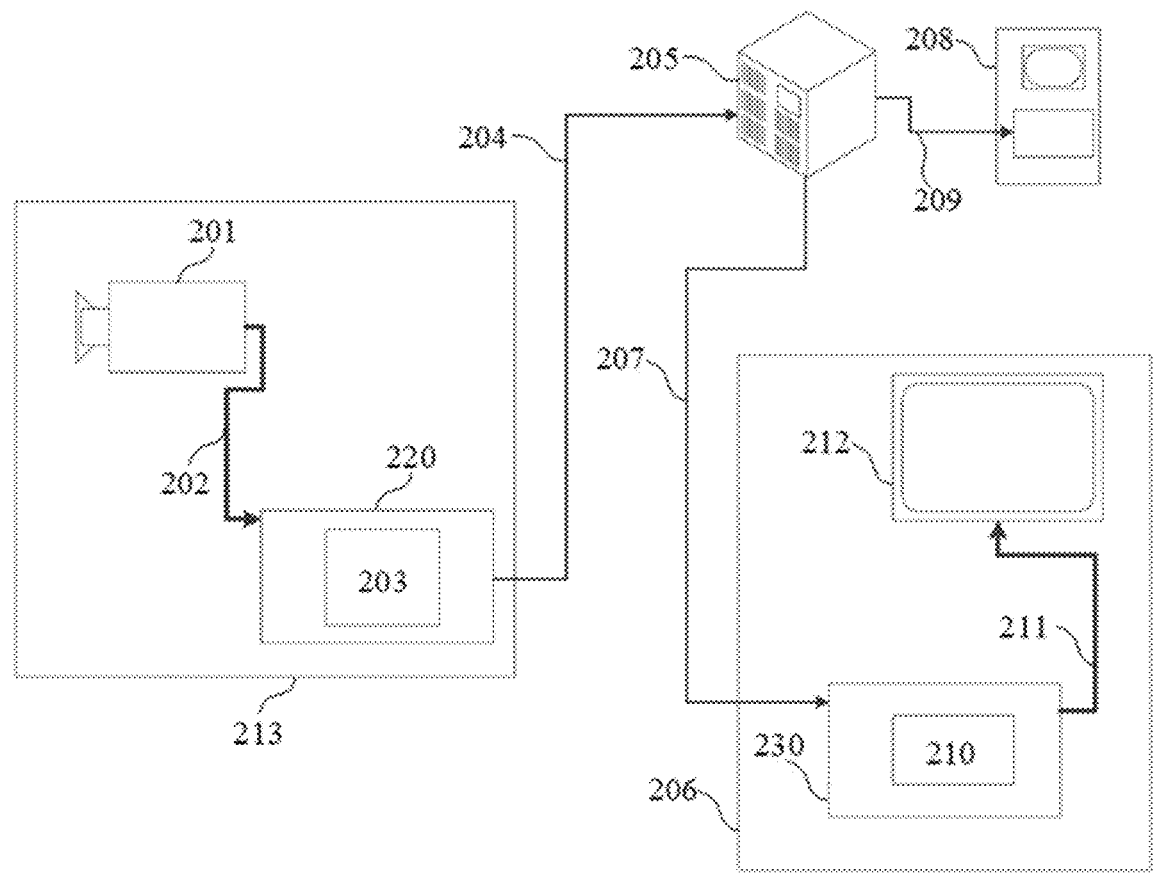
FIG. 2 is a schematic diagram of a placing manner of a video encoding apparatus and a video decoding apparatus in a streaming transmission system.

In an embodiment of the present disclosure, FIG. 2 shows a placing manner of a video encoding apparatus and a video decoding apparatus in a streaming transmission environment. A topic disclosed in the present disclosure is equally applicable to other video-enabled applications including, for example, video conference and digital television (TV), and to storing compressed video on digital media including CD, DVD, memory stick, or the like.

A streaming system may include an acquisition subsystem 213. The acquisition subsystem 213 may include a video source 201 such as a digital camera, and the video source creates an uncompressed video and picture stream 202. In an embodiment, the video and picture stream 202 includes samples captured by a digital camera. Compared with the encoded video data 204 (or the encoded video bitstream 204), the video and picture stream 202 is depicted as a thick line to emphasize the video and picture stream of a high data volume. The video and picture stream 202 may be processed by an electronic apparatus 220, and the electronic apparatus 220 includes a video encoding apparatus 203 coupled to a video source 201. The video encoding apparatus 203 may include hardware, software, or a combination of hardware and software to implement various aspects of the disclosed topic as described in detail below. Compared with the video and picture stream 202, the encoded video data 204 (or encoded video bitstream 204) is depicted as a thin line to emphasize the encoded video data 204 (or encoded video bitstream 204) of a lower data volume, which may be stored on a streaming transmission server 205 for future use. One or more streaming transmission client subsystems, such as a client subsystem 206 and a client subsystem 208 in FIG. 2, may access the streaming transmission server 205 to retrieve a copy 207 and a copy 209 of the encoded video data 204. The client subsystem 206 may include, for example, a video decoding apparatus 210 in the electronic apparatus 230. The video decoding apparatus 210 decodes the transmission copy 207 of the encoded video data and produces an output video and picture stream 211 that can be presented on a display 212 (for example, a display screen) or another presentation apparatus. In some streaming transmission systems, encoded video data 204, video data 207, and video data 209 (for example, video bitstreams) may be encoded according to specific video encoding/compression standards. Embodiments of these standards include ITU-T H.265. In an embodiment, a video coding standard under development is informally referred to as versatile video coding (VVC), and the present disclosure may be used in the context of the VVC standard.

The electronic apparatus 220 and the electronic apparatus 230 may include other components not shown in the figure. For example, the electronic apparatus 220 may include a video decoding apparatus, and the electronic apparatus 230 may further include a video encoding apparatus.

In an embodiment of the present disclosure, using the international video coding standard High Efficiency Video Coding (HEVC), Versatile Video Coding (VVC), and the China national video coding standard Audio Video Coding Standard (AVS) as an example, after a video frame image is inputted, a video frame image is divided into several non-overlapping processing units according to a block size, and each processing unit performs a similar compression operation. The processing unit is referred to as a coding tree unit (CTU), or LCU. The CTU may continue to be further divided into finer divisions to obtain one or more coding units CU, and the CU is the most element in a coding link. The following introduces some concepts when the CU is encoded:

Predictive coding: Predictive coding includes intra-frame prediction and inter-frame prediction. After an original video signal is predicted by a selected reconstructed video signal, a residual video signal is obtained. An encoder side determines which predictive coding mode to select for the current CU and inform a decoder side. The intra-frame prediction refers to that a predicted signal comes from a region that has been encoded and reconstructed in the same image; and the inter-frame prediction refers to that a predicted signal comes from another image (referred to as a reference image) that has been encoded and is different from the current image.

Transform & Quantization: After a residual video signal undergoes transformation operations such as Discrete Fourier Transform (DFT) and DCT, a signal is transformed into a transformation domain, which is referred to as a transformation coefficient. A lossy quantization operation is further performed on the transformation coefficient, and a specific amount of information is lost, so that the quantized signal is beneficial to a compressed expression. In some video coding standards, there may be more than one transformation manner to be selected. Therefore, the encoder side also selects one of the transformation manners for the current CU and inform the decoder side. The degree of fineness of quantization is usually determined by the quantization parameter (QP). A larger value of the QP represents that coefficients within a greater range will be quantized as the same output, and therefore, may usually bring a greater distortion and lower bit rate; and conversely, a smaller value of the QP represents that coefficients within a smaller range will be quantized as a same output, and therefore, may usually bring a smaller distortion while corresponding to a higher bit rate.

Entropy coding or statistical coding: Statistical compression coding is performed quantized transform domain signals according to frequencies of occurrence of values, and finally, a binarized (0 or 1) compressed bitstream is outputted. In addition, other information is produced during the coding, such as the selected encoding mode and motion vector data, and the entropy coding also is performed to reduce the bit rate. Calculation coding is a lossless coding manner that can effectively reduce the bit rate desired to express the same signal. Common calculation coding manners include variable length coding (VLC) or content adaptive binary arithmetic coding (CABAC).

Loop filtering: The transformed and quantized signal obtains a reconstructed image through operations such as inverse quantization, inverse transformation, and prediction compensation. Compared with an original image, the reconstructed image is different from the original image in some information due to the influence of quantization, that is, distortion is produced in the reconstructed image. Therefore, filtering operations can be performed on the reconstructed image, such as deblocking filter (DB), sample adaptive offset (SAO), or adaptive loop filter (ALF), which can effectively reduce the degree of distortion produced by quantization. Because these filtered reconstructed images are used as references for subsequent encoded images to predict future image signals, the filtering operation is also referred to as the loop filtering, that is, a filtering operation in an encoding loop.

Figure 3:
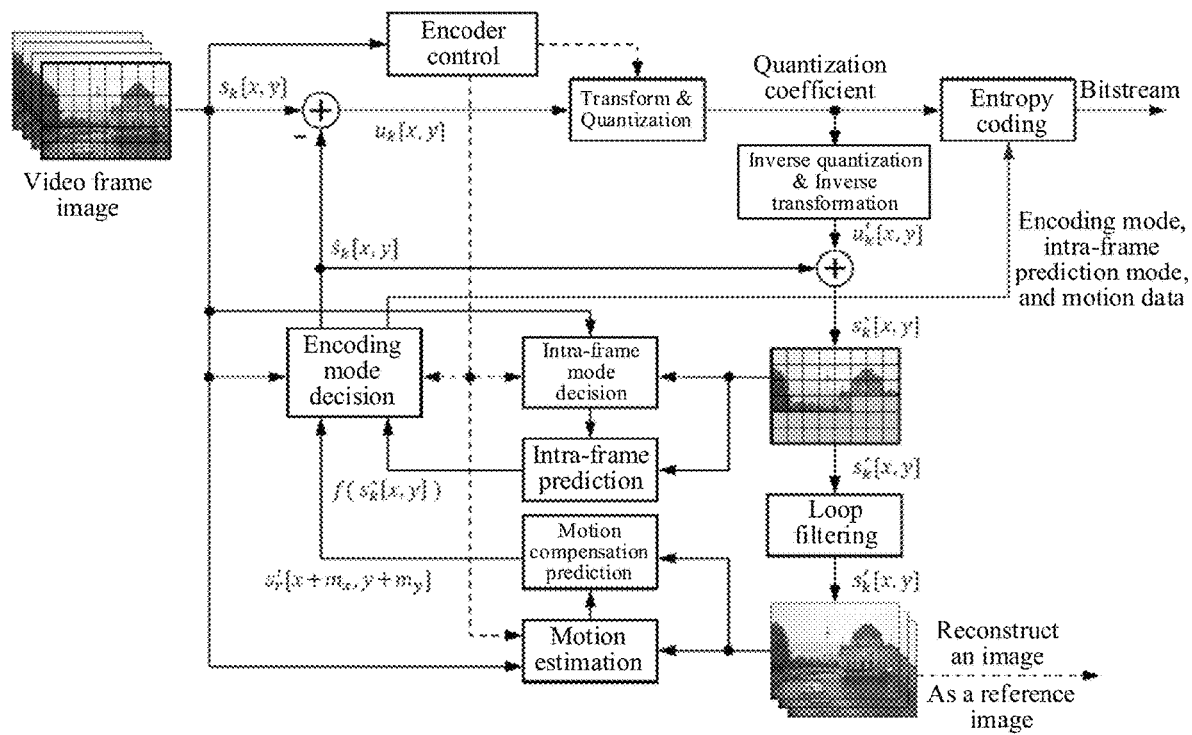
FIG. 3 is a schematic flowchart of a video encoder.

In an embodiment of the present disclosure, FIG. 3 is a flowchart of a video encoder, in which description is made by using the intra-frame prediction as an example. A difference operation is performed between the original image signal $s_k[x,y]$ and the predicted image signal $\hat{s}_k[x,y]$ to obtain a residual signal $u_k[x,y]$. Transform and quantization processing is performed on the residual signal $u_k[x,y]$ to obtain quantization coefficients. On the one hand, entropy coding is performed on the quantization coefficients to obtain the encoded bitstream (that is, the encoded video bitstream). On the other hand, inverse quantization and inverse transformation processing is performed on the quantization coefficients to obtain the reconstructed residual signal $u'_k[x,y]$, and the predicted image signal $\hat{s}_k[x,y]$ and the reconstructed residual signal $u'_k[x,y]$ are superimposed to generate an image signal $s^*_k[x,y]$. On the one hand, the image signal $s^*_k[x,y]$ is inputted to an intra-frame mode decision-making module and an intra-frame prediction module for intra-frame prediction processing. On the other hand, a reconstructed image signals $s'_k[x,y]$ is outputted through the loop filtering, and the reconstructed image signals $s'_k[x,y]$ may be used as a reference image of the next frame for motion estimation and motion compensation prediction. A predicted image signal $\hat{s}_k[x,y]$ of the next frame is obtained based on a result $s'_r[x+m_x,y+m_y]$ of the motion compensation prediction and a result of the intra-frame prediction $f(s^*_k[x,y])$, and the process is repeated until the encoding is performed.

The transformation mode used for the transformation of the residual signal (equivalent to the residual data corresponding to the subsequent encoding block) is determined according to the implicitly derived index value and the value of the index identifier included in the encoding block. The implicitly derived index value includes a correspondence with the calculation result of the quantization coefficients in the quantized coefficient block.

Figure 4:
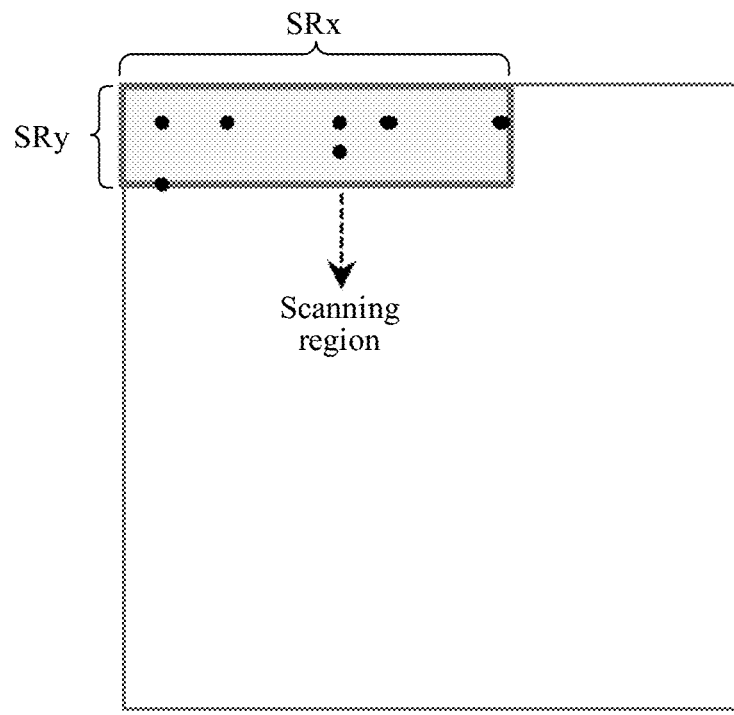
FIG. 4 is a schematic scanning region marked by an SRCC technology.
Figure 5:
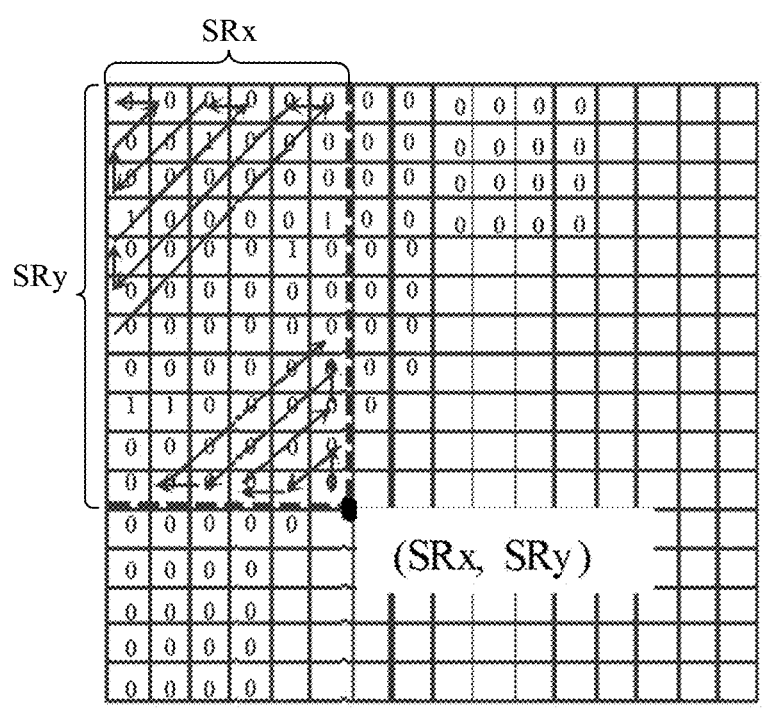
FIG. 5 is a schematic diagram of a sequence of scanning the marked scanning region.

In addition, because non-zero coefficients of the residual signal in the quantized coefficient block after transform and quantization processing is performed has a high probability to be concentrated in the left and upper regions of the block, while the non-zero coefficients in the right and lower regions of the block are often 0, the SRCC technology is introduced. A size SRx×SRy of the upper left region of the non-zero coefficients included in each quantized coefficient block (the size is W×H) may be marked by the SRCC technology, where SRx is a horizontal coordinate of the rightmost non-zero coefficient in the quantized coefficient block, SRy is a vertical coordinate of the lowermost non-zero coefficient in the quantized coefficient block, and 1≤SRx≤W, 1≤SRy≤H, and coefficients outside the region are all 0. The SRCC technology determines the quantized coefficient region that is scanned in the quantized coefficient block by using (SRx, SRy). As shown in FIG. 4, only the quantization coefficients in the scanning region marked by (SRx, SRy) be encoded. A scanning sequence of the encoding is shown in FIG. 5, which can be a reverse zigzag scanning from a lower right corner to an upper left corner.

Based on the encoding process, for each CU at the decoder side, after obtaining the compressed bitstream (that is, bitstream), entropy decoding is performed to obtain various mode information and quantization coefficients. The inverse quantization and inverse transformation processing is performed on the quantization coefficients to obtain the residual signal. On the other hand, according to the known encoding mode information, the predicted signal corresponding to the CU may be obtained. The reconstructed signal may be obtained by adding the residual signal to the predicted signal. An operation such as the loop filtering is performed on the reconstructed signal to generate a final output signal.

In the encoding and decoding process, the transformation processing performed on the residual signal causes energy of the residual signal to be concentrated on less low-frequency coefficients, that is, most coefficients have smaller values. Then, a subsequent quantization module converts the smaller coefficient value into a zero value, which greatly reduces the cost of encoding the residual signal. However, due to the diversity of residual distribution, a single DCT transformation kernel cannot adapt to all residual features. Therefore, transformation kernels such as DST7 and DCT8 are introduced into the transformation processing process, and different transformation kernels can be used for horizontal transformation and vertical transformation on the residual signal. Using the adaptive multiple core transform (AMT) technology as an example, the possible transformation combinations that may be selected for performing transformation processing on a residual signal are as follows: (DCT2, DCT2), (DCT8, DCT8), (DCT8, DST7), (DST7, DCT8), and (DST7, DST7).

Figure 6:
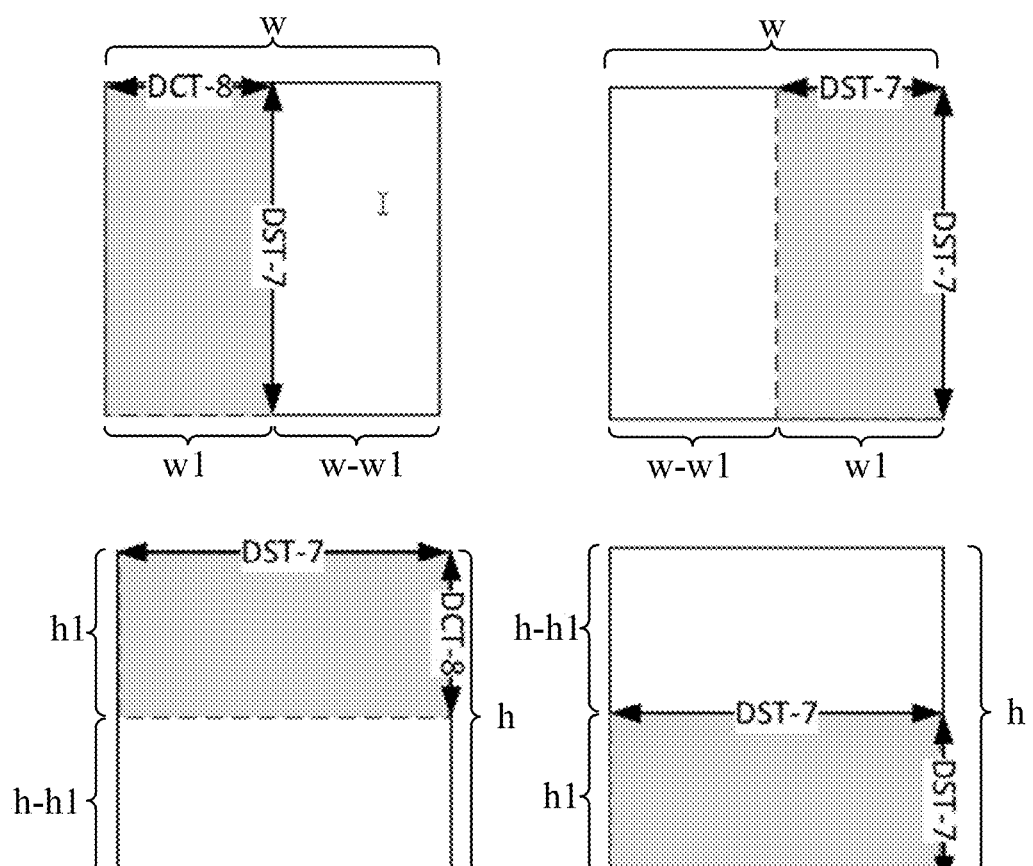
FIG. 6 is a schematic diagram of a transformation combination in the sub-block transformation technology.

In addition, for the inter-frame encoding mode, the sub-block transform (SBT) technology is also mentioned in AVS3. There are eight sub-block division results in the SBT, and transformation encoding is performed only on a gray part (non-zero residual sub-block) in the sub-block, and a white part (zero residual sub-block) is forcibly cleared. For the selection of transformation combination of the sub-block, when a width or a height of the non-zero residual sub-block is 64, the horizontal transformation and the vertical transformation of the non-zero residual sub-block are both DCT-2; and in other scenarios, the selection of the horizontal transformation and the vertical transformation is shown in FIG. 6. In FIG. 6, horizontal transformation encoding and vertical transformation encoding are performed on the gray part in the sub-block according to the identified transformation mode, while the white part is forcibly cleared, and w1 in FIG. 6 may be ½ of the width (w), or may be ¼ of w; and h1 may be ½ of the height (h), or may be ¼ of h.

In addition, some solutions propose to skip transform in a process of residual encoding in the gray part, and directly perform quantization and coefficient coding.

As for which transformation combination to be selected for the residual signal, rate-distortion optimization (RDO) is used at the encoder side to make a decision. In addition, some residuals have weak correlations, and therefore, may skip the transformation process. Due to the diversity of the residual data, a single DCT transformation kernel cannot adapt to all residual features, a plurality of DCT transformation kernels or DST transformation kernels may be selected as a transformation matrix combination for one residual block. In this scenario, although the adaptability of the transformation matrix combination to the residual block is improved, the encoding amount of a transformation mode index is increased, resulting in low encoding efficiency.

In view of the problems, in this embodiment of the present disclosure, the corresponding transformation mode is provided based on the implicitly derived index value and the explicit index identifier included in the encoding block. In this way, the encoding amount of the index identifier may be reduced based on indicating more transformation modes, which is beneficial to improve the video encoding efficiency.

Figure 7:
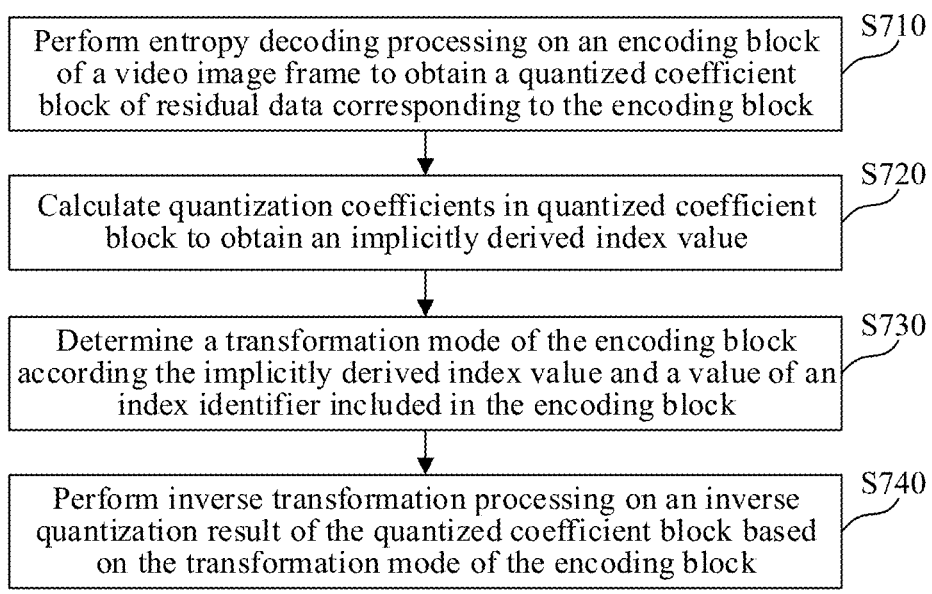
FIG. 7 is a schematic flowchart of a video decoding method according to certain embodiment(s) of the present disclosure.

The implementation details of the technical solution of this embodiment of the present disclosure are described in detail as follows:

FIG. 7 is a flowchart of a video decoding method according to an embodiment of the present disclosure. The video decoding method may be performed by a computing device, such as a terminal device or a server. With reference to FIG. 7, the video decoding method includes at least step S710 to step S740. A detailed description is as follows:

Step S710. Perform entropy decoding processing on an encoding block of a video image frame to obtain a quantized coefficient block of residual data corresponding to the encoding block.

In an embodiment of the present disclosure, the video image frame sequence includes a series of images, and each image may be further divided into slices. The slices may be divided into a series of LCUs (or CTUs), and the LCUs include several CUs. Each image may be referred to as a video image frame. The video image frame is encoded in blocks during encoding. In some new video coding standards, such as the H.264 standard, there are macroblocks (MB). The macroblocks may be further divided into a plurality of prediction blocks that may be used for the predictive coding. In the HEVC standard, concepts such as a coding unit CU, a prediction unit (PU), and a transform unit (TU) are used, a plurality of block units are functionally divided, and a description is made in which a new tree-based structure is used. For example, the CU may be divided into smaller CUs according to a quadtree, and the smaller CUs may be further divided to form a quadtree structure. The encoding block in this embodiment of the present disclosure may be the CU, or a block smaller than the CU, such as a smaller block obtained by dividing the CU.

Step S720. Calculate quantization coefficients in the quantized coefficient block to obtain an implicitly derived index value.

In an embodiment of the present disclosure, the quantization coefficients in the specified region in the quantized coefficient block may be calculated to obtain a calculation result of the quantization coefficients, and the implicitly derived index value is determined according to parity of the calculation result. In the technical solution of this embodiment, the implicitly derived index value is determined based on the parity of the calculation result. For example, if the calculation result is an odd number, the implicitly derived index value may be 1; and if the calculation result is an even number, the implicitly derived index value may be 0. In certain embodiment(s), if the calculation result is an odd number, the implicitly derived index value may also be 0, and if the calculation result is an even number, the implicitly derived index value may be 1.

In an embodiment of the present disclosure, the quantization coefficients in the specified region in the quantized coefficient block may be calculated to obtain a calculation result of the quantization coefficients, a remainder of the calculation result for a set value is calculated, and the implicitly derived index value is determined according to the remainder. In the technical solution of this embodiment, the implicitly derived index value is determined for the remainder of the set value based on the calculation result. In this solution, possible implicitly derived index values may be more than two, for example, the set value may be 3. In this scenario, a value of the remainder of the calculation result for 3 may be 0, 1, or 2, and each remainder corresponds to an implicitly derived index value. For example, the remainder may be directly used as an implicitly derived index value.

In an embodiment of the present disclosure, in the embodiments, calculating the quantization coefficients in the specified region in the quantized coefficient block may include calculating a quantity of non-zero coefficients, even coefficients, non-zero even coefficients, or odd coefficients in the specified region in the quantized coefficient block, and using the quantity as the calculation result of the quantization coefficients. The specified region may be an entire region in the quantized coefficient block, may also be a partial region in the quantized coefficient block (such as one or more positions specified in the quantized coefficient block, at least one row specified in the quantized coefficient block, at least one column specified in the quantized coefficient block, at least one row specified in the quantized coefficient block, and a position on at least one oblique line in the quantized coefficient block), and may further be an SRCC region in the quantized coefficient block, such as an entire SRCC region or a part of the SRCC region. The part of the SRCC region may be one or more positions specified in the SRCC region, at least one row specified in the SRCC region, at least one column specified in the SRCC region, at least one row and at least one column specified in the SRCC region, and a position on at least one oblique line in the SRCC region, Continuing to refer to FIG. 7, step S730. Determine a transformation mode of the encoding block according to the implicitly derived index value and a value of an index identifier included in the encoding block.

In an embodiment of the present disclosure, the index identifier included in the encoding block is an explicit index identifier, and a value of the index identifier may be 1 or 0. One encoding block may include one or more index identifiers. That is, one encoding block may include one or more indication bits, and each indication bit is used for representing an index identifier.

In an embodiment of the present disclosure, in response to determining the transformation mode of the encoding block according to the implicitly derived index value and the value of the index identifier included in the encoding block, the implicitly derived index value and the value of the index identifier may be combined according to the set arrangement and combination manner to generate a combined index, and then, the transformation mode corresponding to the combined index is selected as the transformation mode of the encoding block according to the correspondence between the index value and the transformation mode.

In an embodiment of the present disclosure, if the encoding block includes one index identifier (for the convenience of distinction, the index identifier is referred to as an explicit index hereinafter), then, the set arrangement and combination manner may be either the explicit index before the implicitly derived index value, or the implicitly derived index value before the explicit index. That is, the combined index may be either a manner of "explicit index+implicitly derived index value" or a manner of "implicitly derived index value+explicit index".

In an embodiment of the present disclosure, if the encoding block includes two index identifiers (the index identifiers are referred to as an explicit index 1 and an explicit index 2 hereinafter), then, the set arrangement and combination manner may be either the two explicit indices before the implicitly derived index value, or the implicitly derived index value before the two explicit indices, or the implicitly derived index value being between the two explicit indices. That is, the combined index may be either a manner of "explicit index 1+explicit index 2+implicitly derived index value", or a manner of "implicitly derived index value+explicit index 1+explicit index 2", or a manner of "explicit index 1+implicitly derived index value+explicit index 2".

Similarly, if the encoding block includes a larger quantity of index identifiers, these index identifiers may be combined with implicitly derived index values according to the set arrangement and combination manner.

In an embodiment of the present disclosure, the correspondence between the index value and the transformation mode in the embodiment is preset according to the value of the combined index and the set transformation mode. The set transformation mode includes at least one of the following: a transformation matrix combination used for performing horizontal transformation and vertical transformation, an SBT mode, and a transform skip mode.

In an embodiment of the present disclosure, a transformation kernel used for horizontal transformation and a transformation kernel used for vertical transformation in the transformation matrix combination may be selected from following transformation kernels: a DCT2 transformation kernel, a DCT5 transformation kernel, a DCT8 transformation kernel, a DST1 transformation kernel, and a DST7 transformation kernel. For example, the transformation matrix combination may be: (DCT2, DCT2), (DCT8, DCT8), (DCT8, DST7), (DST7, DCT8), or (DST7, DST7). The first transformation kernel in the transformation matrix combination represents the transformation kernel used for performing the horizontal transformation, and the second transformation kernel represents the transformation kernel used for performing the vertical transformation. For example, the transformation matrix combination (DCT8, DST7) represents that the horizontal transformation is performed by DCT8, and the vertical transformation is performed by DST7.

Based on the technical solutions of the embodiments, in an example of the present disclosure, if one explicit index is included in the encoding block, the correspondence between the index value and the transformation mode in the embodiment may be as shown in Table 1:

TABLE 1

| Explicit index | Implicitly derived index value | Transformation mode |
|---|---|---|
| 1 | 0 | (DST7, DST7) |
|   | 1 | (DCT8, DST7) |
| 0 | — | (DCT2, DCT2) |

In Table 1, the set arrangement and combination manner is the explicit index before the implicitly derived index value. In Table 1, a scenario in which the explicit index is "0" and the implicitly derived index value is "−" represents that: when a value of the explicit index is 0, no matter what the implicitly derived index value is, the transformation mode is (DCT2, DCT2). In this scenario, the encoder side may perform implicit indication without adjusting the quantized coefficient block, and the decoder side does not need to perform a process of implicitly deriving the index (In addition, even if the encoder side adjusts the quantized coefficient block for implicit indication, the decoder side does not need to perform the process of implicitly deriving the index). The value of the explicit index and the implicitly derived index value in Table 1, and the corresponding transformation modes are just examples. In other embodiments of the present disclosure, there may also be other manners, as shown in Table 2 and Table 3:

TABLE 2

| Explicit index | Implicitly derived index value | Transformation mode |
|---|---|---|
| 0 | — | SBT |
| 1 | 0 | (DST7, DST7) |
|   | 1 | (DCT2, DCT2) |

In Table 2, a scenario in which the explicit index is "0" and the implicitly derived index value is "−" represents that: when a value of the explicit index is 0, no matter what the implicitly derived index value is, the transformation mode is SBT. In this scenario, the encoder side can perform implicit indication without adjusting the quantized coefficient block, and the decoder side does not need to perform a process of implicitly deriving the index (In addition, even if the encoder side adjusts the quantized coefficient block for implicit indication, the decoder side does not need to perform the process of implicitly deriving the index).

TABLE 3

| Explicit index | Implicitly derived index value | Transformation mode |
|---|---|---|
| 0 | — | SBT |
| 1 | 0 | TS |
|   | 1 | (DCT2, DCT2) |

In Table 3, a scenario in which the explicit index is "0" and the implicitly derived index value is "−" represents that: when a value of the explicit index is 0, no matter what the implicitly derived index value is, the transformation mode is SBT. In this scenario, the encoder side can perform implicit indication without adjusting the quantized coefficient block, and the decoder side does not need to perform a process of implicitly deriving the index (In addition, even if the encoder side adjusts the quantized coefficient block for implicit indication, the decoder side does not need to perform the process of implicitly deriving the index). "TS" in Table 3 represents the transform skip mode, that is, the transformation process is skipped during encoding, and the inverse transformation process is skipped during decoding.

In an embodiment of the present disclosure, if one explicit index is included in the encoding block, the correspondence between the index value and the transformation mode in the embodiment may further be as shown in Table 4:

TABLE 4

| Implicitly derived index value | Explicit index | Transformation mode |
|---|---|---|
| 0 | 0 | (DST7, DST7) |
|   | 1 | (DCT8, DST7) |
| 1 | — | (DCT2, DCT2) |

In Table 4, the set arrangement and combination manner is the implicitly derived index value before the explicit index. In Table 4, a scenario in which the implicitly derived index value is "1" and the explicit index is "–" represents that: when the implicitly derived index value is 1, no matter what a value of the explicit index is, the transformation mode is (DCT2, DCT2). In this scenario, the encoder side does not need to encode the explicit index in the encoding block, and the decoder side does not need to perform the decoding process of the explicit index.

In an embodiment of the present disclosure, if two explicit indices are included in the encoding block, the correspondence between the index value and the transformation mode in the embodiment may be as shown in Table 5:

TABLE 5

| Explicit index 1 | Explicit index 2 | Implicitly derived index value | Transformation mode |
|---|---|---|---|
| 1 | 1 | 0 | (DST7, DST7) |
|   |   | 1 | (DCT8, DST7) |
|   | 0 | — | SBT |
| 0 | — | — | (DCT2, DCT2) |

In Table 5, the set arrangement and combination manner is two explicit indices before the implicitly derived index value. In Table 5, a scenario in which the explicit index 1 is "1", the explicit index 2 is "0", and the implicitly derived index value is "–" represents that: when a value of the explicit index 1 is 1, and a value of the explicit index 2 is "0", no matter what the implicitly derived index value is, the transformation mode is SBT. In this scenario, the encoder side can perform implicit indication without adjusting the quantized coefficient block, and the decoder side does not need to perform a process of implicitly deriving the index (In addition, even if the encoder side adjusts the quantized coefficient block for implicit indication, the decoder side does not need to perform the process of implicitly deriving the index).

In Table 5, a scenario in which the explicit index 1 is "0", the explicit index 2 is "–", and the implicitly derived index value is "–" represents that: when a value of the explicit index 1 is 0, no matter what a value of the explicit index 2 is and what the implicitly derived index value is, the transformation mode is (DCT2, DCT2). In this scenario, the encoder side can perform implicit indication without adjusting the quantized coefficient block, the encoder side does not need to encode the explicit index 2 in the encoding block, and the decoder side does not need to perform a process of implicitly deriving the index. In addition, the decoder side does not need to perform the decoding process of the explicit index 2 (In addition, even if the encoder side adjusts the quantized coefficient block for implicit indication, the decoder side does not need to perform the process of implicitly deriving the index). The value of the explicit index 1, the value of the explicit index 2, the implicitly derived index value in Table 5, and the corresponding transformation modes are just examples. In other embodiments of the present disclosure, there may also be other manners, as shown in Table 6:

TABLE 6

| Explicit index 1 | Explicit index 2 | Implicitly derived index value | Transformation mode |
|---|---|---|---|
| 1 | — | — | SBT |
| 0 | 1 | 0 | (DST7, DST7) |
|   |   | 1 | (DCT8, DST7) |
|   | 0 | — | (DCT2, DCT2) |

In Table 6, a scenario in which the explicit index 1 is "1", the explicit index 2 is "–", and the implicitly derived index value is "–" represents that: when a value of the explicit index 1 is 1, no matter what a value of the explicit index 2 is and what the implicitly derived index value is, the transformation mode is SBT. In this scenario, the encoder side can perform implicit indication without adjusting the quantized coefficient block, the encoder side does not need to encode the explicit index 2 in the encoding block, and the decoder side does not need to perform a process of implicitly deriving the index. In addition, the decoder side does not need to perform the decoding process of the explicit index 2 (In addition, even if the encoder side adjusts the quantized coefficient block for implicit indication, the decoder side does not need to perform the process of implicitly deriving the index).

In Table 6, a scenario in which the explicit index 1 is "0", the explicit index 2 is "0", and the implicitly derived index value is "–" represents that: when a value of the explicit index 1 is 0, and a value of the explicit index 2 is "0", no matter what the implicitly derived index value is, the transformation mode is (DCT2, DCT2). In this scenario, the encoder side may perform implicit indication without adjusting the quantized coefficient block, and the decoder side does not need to perform a process of implicitly deriving the index (In addition, even if the encoder side adjusts the quantized coefficient block for implicit indication, the decoder side does not need to perform the process of implicitly deriving the index).

In an embodiment of the present disclosure, if two explicit indices are included in the encoding block, the correspondence between the index value and the transformation mode in the embodiment may further be as shown in Table 7:

TABLE 7

| Explicit index 1 | Implicitly derived index value | Explicit index 2 | Transformation mode |
|---|---|---|---|
| 1 | 0 | — | (DST7, DST7) |
|   | 1 | 0 | (DCT8, DST7) |
|   |   | 1 | (DST7, DCT8) |
| 0 | — | — | (DCT2, DCT2) |

In Table 7, the set arrangement and combination manner is the implicitly derived index value being between two explicit indices. In Table 7, a scenario in which the explicit index 1 is "1", the implicitly derived index value is "0", and the explicit index 2 is "–" represents that: when a value of the explicit index 1 is 1, and the implicitly derived index value is 0, no matter what a value of the explicit index 2 is, the transformation mode is (DST7, DST7). In this scenario, the encoder side does not need to encode the explicit index 2 in the encoding block, and the decoder side does not need to perform the decoding process of the explicit index 2.

In Table 7, a scenario in which the explicit index 1 is "0", the implicitly derived index value is "–", and the explicit index 2 is "–" represents that: when a value of the explicit index 1 is 0, no matter what the implicitly derived index value is and what a value of the explicit index 2 is, the transformation mode is (DCT2, DCT2). In this scenario, the encoder side can perform implicit indication without adjusting the quantized coefficient block, the encoder side does not need to encode the explicit index 2 in the encoding block, and the decoder side does not need to perform a process of implicitly deriving the index. In addition, the decoder side does not need to perform the decoding process of the explicit index 2 (In addition, even if the encoder side adjusts the quantized coefficient block for implicit indication, the decoder side does not need to perform the process of implicitly deriving the index).

The correspondences shown in Table 1 to Table 7 are only examples, and in other embodiments of the present disclosure, the correspondence may be preset based on the value of the combined index and the set transformation mode.

In an embodiment of the present disclosure, it may be determined whether the encoding block jointly determines the transformation mode corresponding to the encoding block according to the implicitly derived index value and the index identifier included in the encoding block, if yes, then, the step of determining the transformation mode of the encoding block according to the implicitly derived index value and the value of the index identifier included in the encoding block is performed.

In some scenarios, a manner of determining whether the encoding block jointly determines the transformation mode corresponding to the encoding block according to the implicitly derived index value and the index identifier included in the encoding block may include at least one of the following: an index identifier included in a sequence header of encoded data corresponding to a video image frame sequence, an index identifier included in an image header of encoded data corresponding to a video image frame, and a size of the encoding block.

In an embodiment of the present disclosure, a value of the index identifier included in the sequence header is used for indicating whether all encoding blocks, or encoding blocks in an intra-frame encoding mode, or encoding blocks in an inter-frame encoding mode in the encoded data corresponding to the video image frame sequence jointly determine the transformation mode corresponding to the encoding block according to the implicitly derived index value and the index identifier included in the encoding block. That is, in this embodiment, the index identifier included in the sequence header either indicates that all encoding blocks in the encoded data corresponding to the video image frame sequence jointly determine the transformation mode corresponding to the encoding block according to the implicitly derived index value and the explicit index, or indicates that the encoding block in the intra-frame encoding mode in the encoded data corresponding to the video image frame sequence jointly determines the transformation mode corresponding to the encoding block according to the implicitly derived index value and the explicit index, or indicates that the encoding block in the inter-frame encoding mode in the encoded data corresponding to the video image frame sequence jointly determines the transformation mode corresponding to the encoding block according to the implicitly derived index value and the explicit index.

In an embodiment of the present disclosure, the sequence header includes two index identifiers, the first index identifier and the second index identifier respectively, where a value of the first index identifier and a value of the second index identifier are respectively used for indicating whether encoding blocks in an intra-frame encoding mode and encoding blocks in an inter-frame encoding mode in the encoded data corresponding to the video image frame sequence jointly determine the transformation mode corresponding to the encoding block according to the implicitly derived index value and the explicit index. That is, in this embodiment, the sequence header includes index identifiers respectively corresponding to the encoding block in the intra-frame encoding mode and the encoding block in the inter-frame encoding mode, to respectively indicate whether the two types of encoding blocks jointly determine the transformation mode corresponding to the encoding block according to the implicitly derived index value and the explicit index.

For example, if a value of the index identifier included in the sequence header is used for indicating whether all encoding blocks in the encoded data corresponding to the video image frame sequence jointly determine the transformation mode corresponding to the encoding block according to the implicitly derived index value and the index identifier included in the encoding block, and to perform indication by a size of the sequence header and a size of the encoding block, a specific indication manner may be:

If the index identifier in the sequence header of the encoded data corresponding to the video image frame sequence is 1 (the value is only an example), then, if the size of a specific encoding block in the encoded data corresponding to the video image frame sequence is less than the set value, it indicates that the encoding block jointly determines the transformation mode corresponding to the encoding block according to the implicitly derived index value and the index identifier included in the encoding block.

On the contrary, if the index identifier in the sequence header of the encoded data corresponding to the video image frame sequence is 1, then, if the size of a specific encoding block in the encoded data corresponding to the video image frame sequence is larger than the set value, it indicates that the encoding block does not jointly determine the transformation mode corresponding to the encoding block according to the implicitly derived index value and the index identifier included in the encoding block.

Alternatively, if the index identifier in the sequence header of the encoded data corresponding to the video image frame sequence is 0 (the value is only an example), it indicates that all the encoding blocks in the encoded data corresponding to the video image frame sequence do not need to jointly determine the transformation mode corresponding to the encoding block according to the implicitly derived index value and the index identifier included in the encoding block.

Continuing to refer to FIG. 7, step S740. Perform inverse transformation processing on the inverse quantization result of the quantized coefficient block based on the transformation mode corresponding to the encoding block. For the process, reference may be made to the related descriptions in the embodiments, and details are not repeated herein.

In the technical solutions of the embodiments of the present disclosure, the corresponding transformation mode may be indicated based on the implicitly derived index value and the explicit index identifier included in the encoding block. In this way, the encoding amount of the index identifier may be reduced based on indicating more transformation modes, which is beneficial to improve the video encoding efficiency.

The following describes apparatus embodiments of the present disclosure, and the apparatus embodiments may be used for performing the video decoding method in the embodiment of the present disclosure. For details not disclosed in the apparatus embodiments of the present disclosure, reference may be made to the video decoding method embodiments of the present disclosure.

Figure 8:
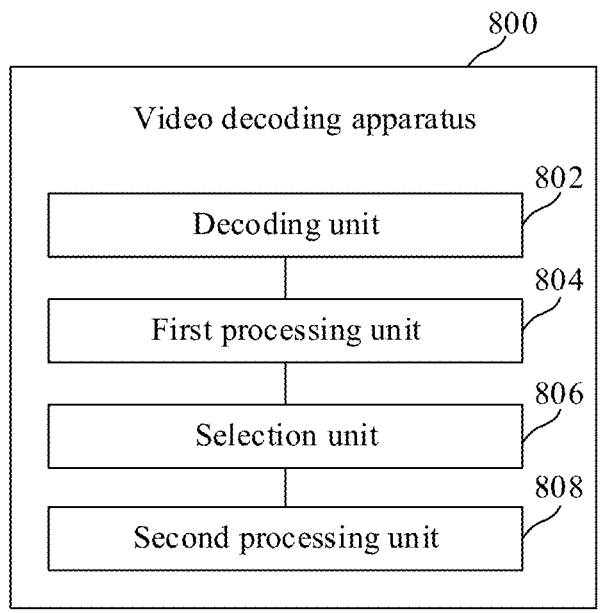
FIG. 8 is a schematic block diagram of a video decoding apparatus according to certain embodiment(s) of the present disclosure.

FIG. 8 is a block diagram of a video decoding apparatus according to an embodiment of the present disclosure. The video decoding apparatus may be arranged in a computing device, such as a terminal device or a server.

Referring to FIG. 8, the video decoding apparatus 800 according to an embodiment of the present disclosure includes: a decoding unit 802, a first processing unit 804, a selection unit 806, and a second processing unit 808.

A decoding unit 802 is configured to perform entropy decoding processing on an encoding block of a video image frame to obtain a quantized coefficient block of residual data corresponding to the encoding block; a first processing unit 804 is configured to calculate quantization coefficients in the quantized coefficient block to obtain an implicitly derived index value; a selection unit 806 is configured to determine a transformation mode of the encoding block according to the implicitly derived index value and a value of an index identifier included in the encoding block; and a second processing unit 808 is configured to perform inverse transformation processing on an inverse quantization result of the quantized coefficient block based on the transformation mode of the encoding block.

In some embodiments of the present disclosure, based on the solution, the video decoding apparatus 800 further includes: a determining unit, configured to determine for the encoding block, whether the transformation mode corresponding to the encoding block is jointly determined according to the implicitly derived index value and the index identifier included in the encoding block; and if yes, trigger the selection unit to perform a step of determining a transformation mode of the encoding block according to the implicitly derived index value and a value of an index identifier included in the encoding block.

In some embodiments of the present disclosure, based on the solution, a manner in which the determining unit determines for the encoding block, whether the transformation mode corresponding to the encoding block is jointly determined according to the implicitly derived index value and the index identifier included in the encoding block includes at least one of the following: an index identifier included in a sequence header of encoded data corresponding to a video image frame sequence, an index identifier included in an image header of encoded data corresponding to a video image frame, and a size of the encoding block.

In some embodiments of the present disclosure, based on the solution, a value of the index identifier included in the sequence header is used for indicating whether all encoding blocks, or encoding blocks in an intra-frame encoding mode, or encoding blocks in an inter-frame encoding mode in the encoded data corresponding to the video image frame sequence jointly determine the transformation mode corresponding to the encoding block according to the implicitly derived index value and the index identifier included in the encoding block.

In some embodiments of the present disclosure, based on the solution, a value of a first index identifier and a value of a second index identifier included in the sequence header are respectively used for indicating whether encoding blocks in an intra-frame encoding mode and encoding blocks in an inter-frame encoding mode in the encoded data corresponding to the video image frame sequence jointly determine the transformation mode corresponding to the encoding block according to the implicitly derived index value and the index identifier included in the encoding block.

In some embodiments of the present disclosure, based on the solution, the first processing unit 804 is configured to: calculate quantization coefficients in a specified region in the quantized coefficient block to obtain a calculation result of the quantization coefficients; and determine the implicitly derived index value according to parity of the calculation result.

In some embodiments of the present disclosure, based on the solution, the first processing unit 804 is configured to: calculate quantization coefficients in a specified region in the quantized coefficient block to obtain a calculation result of the quantization coefficients; and calculate a remainder of the calculation result for a set value; and determine the implicitly derived index value according to the remainder.

In some embodiments of the present disclosure, based on the solution, the first processing unit 804 is configured to calculate a quantity of non-zero coefficients, even coefficients, non-zero even coefficients, or odd coefficients in the specified region in the quantized coefficient block, and use the quantity as the calculation result of the quantization coefficients.

In some embodiments of the present disclosure, based on the solution, the specified region includes an entire region in the quantized coefficient block or an SRCC region in the quantized coefficient block.

In some embodiments of the present disclosure, based on the solution, the selection unit 806 is configured to: combine the implicitly derived index value and the value of the index identifier according to a set arrangement and combination manner to generate a combined index; and select a transformation mode corresponding to the combined index as a transformation mode of the encoding block according to a correspondence between an index value and a transformation mode.

In some embodiments of the present disclosure, based on the solution, the correspondence between the index value and the transformation mode is preset according to a value of the combined index and a set transformation mode.

In some embodiments of the present disclosure, based on the solution, the set transformation mode includes at least one of the following: a transformation matrix combination used for performing horizontal transformation and vertical transformation, a sub-block transformation (SBT) mode, and a transform skip mode.

In some embodiments of the present disclosure, based on the solution, a transformation kernel used for horizontal transformation and a transformation kernel used for vertical transformation in the transformation matrix combination are selected from following transformation kernels: a DCT2 transformation kernel, a DCT5 transformation kernel, a DCT8 transformation kernel, a DST1 transformation kernel, and a DST7 transformation kernel.

In some embodiments of the present disclosure, based on the solution, the encoding block includes at least one of the index identifiers.

Figure 9:
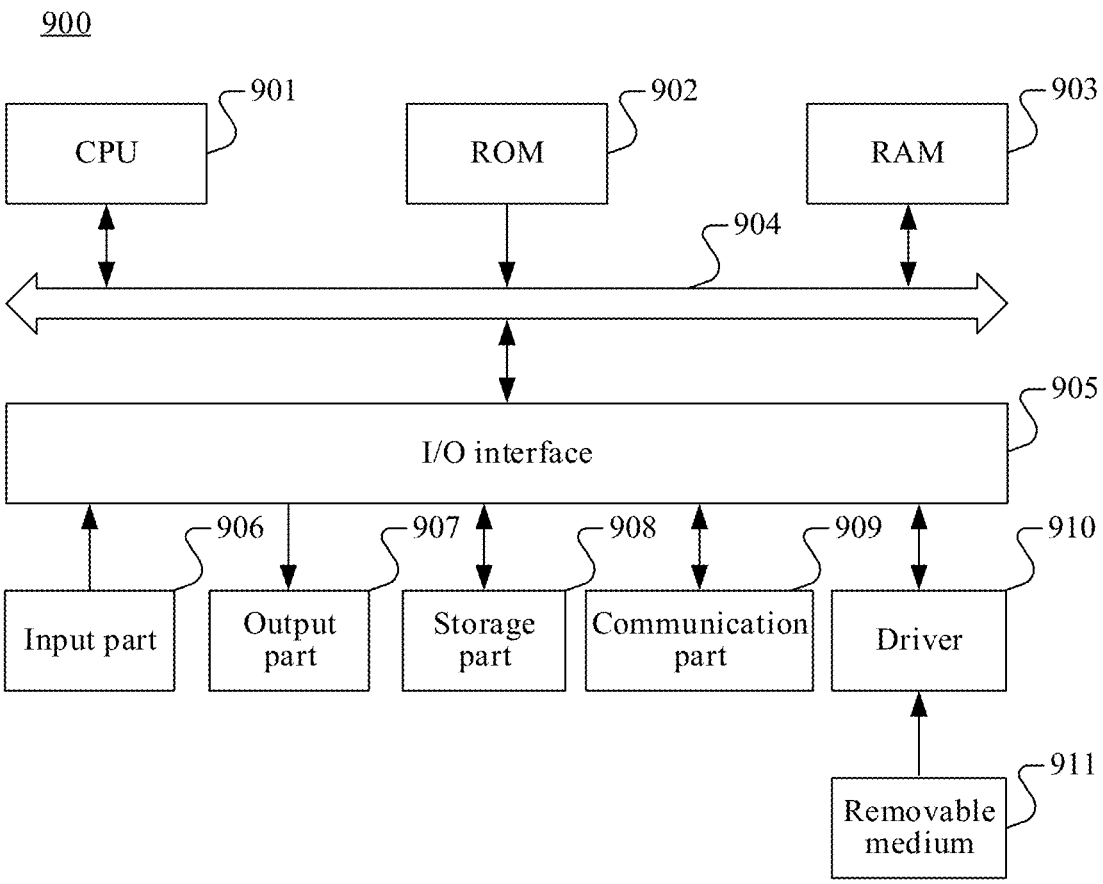
FIG. 9 is a schematic structural diagram of a computer system adapted to implement an electronic device according to certain embodiment(s) of the present disclosure.

FIG. 9 is a schematic structural diagram of a computer system adapted to implement an electronic device according to an embodiment of the present disclosure.

A computer system 900 of the electronic device shown in FIG. 9 is merely an example, and does not constitute any limitation on functions and use ranges of the embodiments of the present disclosure.

As shown in FIG. 9, the computer system 900 includes a central processing unit (CPU) 901, which may perform various suitable actions and processing based on a program stored in a read-only memory (ROM) 902 or a program loaded from a storage part 908 into a random access memory (RAM) 903, for example, perform the method described in the embodiments. The RAM 903 further stores various programs and data desired for system operations. The CPU 901, the ROM 902, and the RAM 903 are connected to each other by using a bus 904. An input/output (I/O) interface 905 is also connected to the bus 904.

The following components are connected to the I/O interface 905: an input part 906 including a keyboard, a mouse, or the like; an output part 907 including a cathode ray tube (CRT), a liquid crystal display (LCD), a speaker, or the like; a storage part 908 including a hard disk, or the like; and a communication part 909 including a network interface card such as a local area network (LAN) card or a modem. The communication part 909 performs communication processing through a network such as the Internet. A driver 910 is also connected to the I/O interface 905 as desired. A removable medium 911, such as a magnetic disk, an optical disc, a magneto-optical disk, or a semiconductor memory, is installed on the drive 910 as desired, so that a computer program read from the removable medium is installed into the storage part 908 as desired.

Particularly, according to an embodiment of the present disclosure, the processes described above by referring to the flowcharts may be implemented as computer software programs. For example, an embodiment of the present disclosure includes a computer program product. The computer program product includes a computer program stored in a computer-readable medium. The computer program includes a computer program used for performing a method shown in the flowchart. In such an embodiment, the computer program may be downloaded and installed from a network through the communication part 909, and/or installed from the removable medium 911. When the computer program is executed by the CPU 901, the various functions defined in the system of the present disclosure are executed.

The computer-readable medium shown in the embodiments of the present disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or component, or any combination thereof. A more specific example of the computer-readable storage medium may include but is not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disc read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, apparatus, or device. In the present disclosure, the computer-readable signal medium may include a data signal transmitted in a baseband or as part of a carrier, and stores a computer-readable computer program. The data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may transmit, propagate, or transmit a program that is used by or used in combination with an instruction execution system, apparatus, or device. The computer program included in the computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments of the present disclosure. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

Related units described in the embodiments of the present disclosure may be implemented in a software manner, or may be implemented in a hardware manner, and the unit described can also be set in a processor. Names of the units do not constitute a limitation on the units in a specific scenario.

According to another aspect, the present disclosure further provides a computer-readable medium. The computer-readable medium may be included in the electronic device described in the embodiments, or may exist alone and is not disposed in the electronic device. The computer-readable medium carries one or more programs, the one or more programs, when executed by the electronic device, causing the electronic device to implement the method described in the embodiments.

Although a plurality of modules or units of a device configured to perform actions are discussed in the detailed description, such division is not mandatory. Actually, according to the implementations of the present disclosure, the features and functions of two or more modules or units described above may be implemented in one module or unit. Conversely, features and functions of one module or unit described above may be further divided into a plurality of modules or units for implementation.

According to the descriptions of the implementations, a person skilled in the art may readily understand that the exemplary implementations described herein may be implemented by using software, or may be implemented by combining software and suitable hardware. Therefore, the technical solutions of the implementations of the present disclosure may be implemented in a form of a software product. The software product may be stored in a non-volatile storage medium (which may be a CD-ROM, a USB flash drive, a removable hard disk, or the like) or on a network, including several instructions for instructing a computing device (which may be a personal computer, a server, a touch terminal, a network device, or the like) to perform the methods according to the implementations of the present disclosure.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

After considering the present disclosure and practicing the disclosed implementations, a person skilled in the art may easily conceive of other implementations of the present disclosure. The present disclosure intends to cover any variations, uses, or adaptive changes of the present disclosure following the general principles of the present disclosure, and includes knowledge and technical means undisclosed in the present disclosure.

It is to be understood that the present disclosure is not limited to the precise structures described above and shown in the accompanying drawings, and various modifications and changes may be made without departing from the scope of the present disclosure. The scope of the present disclosure is topic only to the appended claims.

What is claimed is:

1. A video decoding method, performed by a computing device, the method comprising:
   performing entropy decoding processing on an encoding block of a video image frame to obtain a quantized coefficient block of residual data corresponding to the encoding block;
   calculating quantization coefficients in a specified region in the quantized coefficient block to obtain a calculation result of the quantization coefficients;
   determining an implicitly derived index value based on the calculation result of the quantization coefficients;
   determining a transformation mode of the encoding block according to the implicitly derived index value and a value of an explicit index identifier included in the encoding block, the explicit index identifier including a first index identifier and a second index identifier; and
   performing inverse transformation processing on an inverse quantization result of the quantized coefficient block based on the transformation mode of the encoding block,
   wherein a transformation mode is determined based on one of the following three tables, and "—" indicates that a value of a corresponding index is not considered in a current scenario:

TABLE 1

| Value of the first index identifier | Value of the second index identifier | The implicitly derived index value | Transformation mode |
|---|---|---|---|
| First value | First value | Second value | First mode |
|  |  | First value | Second mode |
|  | Second value | — | Third mode |
| Second value | — | — | Fourth mode |

TABLE 2

| Value of the first index identifier | Value of the second index identifier | The implicitly derived index value | Transformation mode |
|---|---|---|---|
| First value | — | — | Fifth mode |
| Second value | First value | Second value | Sixth mode |
|  |  | First value | Seventh mode |
|  | Second value | — | Eighth mode |

TABLE 3

| Value of the first index identifier | Implicitly derived index value | Value of the second index identifier | Transformation mode |
|---|---|---|---|
| First value | Second value | — | Nineth mode |
|  | First value | Second value | Tenth mode |
|  |  | First value | Eleventh mode |
| Second value | — | — | Twelfth mode. |

2. The video decoding method according to claim 1, further comprising:
   determining, for the encoding block, whether the transformation mode corresponding to the encoding block is jointly determined according to the implicitly derived index value and the explicit index identifier included in the encoding block; and
   in response to determining the transformation mode corresponding to the encoding block is jointly determined, performing the operation of determining a transformation mode of the encoding block according to the implicitly derived index value and a value of the explicit index identifier included in the encoding block.

3. The video decoding method according to claim 2, wherein determining whether the transformation mode corresponding to the encoding block is jointly determined comprises one or more of:
   an index identifier included in a sequence header of encoded data corresponding to a video image frame sequence, an index identifier included in an image header of encoded data corresponding to a video image frame, and a size of the encoding block.

4. The video decoding method according to claim 1, further comprising:
   determining the implicitly derived index value according to parity of the calculation result of the quantization coefficients.

5. The video decoding method according to claim 1, further comprising
   calculating a remainder of the calculation result of the quantization coefficients for a set value; and
   determining the implicitly derived index value according to the remainder.

6. The video decoding method according to claim 1, wherein calculating quantization coefficients comprises:
   calculating a quantity of non-zero coefficients, even coefficients, non-zero even coefficients, or odd coefficients in the specified region in the quantized coefficient block, and using the quantity as the calculation result of the quantization coefficients.

7. The video decoding method according to claim 1, wherein the specified region includes an entire region in the quantized coefficient block or a scan region-based coefficient coding (SRCC) region in the quantized coefficient block.

8. The video decoding method according to claim 1, wherein determining the transformation mode comprises:
   combining the implicitly derived index value and the value of the explicit index identifier according to a set arrangement and combination manner to generate a combined index; and
   selecting a transformation mode corresponding to the combined index as the transformation mode of the encoding block according to a correspondence between an index value and a transformation mode.

9. The video decoding method according to claim 8, wherein the correspondence between the index value and the transformation mode is preset according to a value of the combined index and a set transformation mode.

10. The video decoding method according to claim 9, wherein a set transformation mode includes one or more of:
   a transformation matrix combination used for performing horizontal transformation and vertical transformation, a sub-block transformation (SBT) mode, and a transform skip mode.

11. The video decoding method according to claim 10, wherein a transformation kernel used for horizontal transformation and a transformation kernel used for vertical transformation in the transformation matrix combination are selected from one or more of: a discrete cosine transform DCT2 transformation kernel, a DCT5 transformation kernel, a DCT8 transformation kernel, a discrete sine transform DST1 transformation kernel, and a DST7 transformation kernel.

12. A video encoding method, performed by a computing device, the method comprising:
   performing a difference operation on an original image signal and a predicted image signal corresponding to an encoding block to obtain residual data corresponding to the encoding block;
   performing transform and quantization processing on the residual data according to a transformation mode corresponding to the encoding block to obtain a quantized coefficient block of the residual data corresponding to the encoding block, wherein the transformation mode corresponding to the encoding block is determined according to an implicitly derived index value and a value of an explicit index identifier included in the encoding block, the explicit index identifier includes a first index identifier and a second index identifier, and the implicitly derived index value includes a correspondence with a calculation result of quantization coefficients in a specified region in the quantized coefficient block; and
   performing entropy coding on the quantization coefficients in the quantized coefficient block to obtain an encoded video bitstream,
   wherein a transformation mode is determined based on one of the following tables, and "-" indicates that a value of a corresponding index is not considered in a current scenario:

TABLE 1

| Value of the first index identifier | Value of the second index identifier | The implicitly derived index value | Transformation mode |
|---|---|---|---|
| First value | First value | Second value | First mode |
|  |  | First value | Second mode |
|  | Second value | — | Third mode |
| Second value | — | — | Fourth mode |

TABLE 2

| Value of the first index identifier | Value of the second index identifier | The implicitly derived index value | Transformation mode |
|---|---|---|---|
| First value | — | — | Fifth mode |
| Second value | First value | Second value | Sixth mode |
|  |  | First value | Seventh mode |
|  | Second value | — | Eighth mode |

TABLE 3

| Value of the first index identifier | Implicitly derived index value | Value of the second index identifier | Transformation mode |
|---|---|---|---|
| First value | Second value | — | Nineth mode |
|  | First value | Second value | Tenth mode |
|  |  | First value | Eleventh mode |
| Second value | — | — | Twelfth mode. |

13. A video decoding apparatus, arranged in a computing device, the apparatus comprising: a memory storing computer program instructions; and a processor coupled to the memory and configured to execute the computer program instructions and perform:
   performing entropy decoding processing on an encoding block of a video image frame to obtain a quantized coefficient block of residual data corresponding to the encoding block;
   calculating quantization coefficients in a specified region in the quantized coefficient block to obtain a calculation result of the quantization coefficients;
   determining an implicitly derived index value based on the calculation result of the quantization coefficients;
   determining a transformation mode of the encoding block according to the implicitly derived index value and a value of an explicit index identifier included in the encoding block, the explicit index identifier including a first index identifier and a second index identifier; and
   performing inverse transformation processing on an inverse quantization result of the quantized coefficient block based on the transformation mode of the encoding block,
   wherein a transformation mode is determined based on one of the following three tables, and "-" indicates that a value of a corresponding index is not considered in a current scenario:

TABLE 1

| Value of the first index identifier | Value of the second index identifier | The implicitly derived index value | Transformation mode |
|---|---|---|---|
| First value | First value | Second value | First mode |
|  |  | First value | Second mode |
|  | Second value | — | Third mode |
| Second value | — | — | Fourth mode |

TABLE 2

| Value of the first index identifier | Value of the second index identifier | The implicitly derived index value | Transformation mode |
|---|---|---|---|
| First value | — | — | Fifth mode |
| Second value | First value | Second value | Sixth mode |
|  |  | First value | Seventh mode |
|  | Second value | — | Eighth mode |

TABLE 3

| Value of the first index identifier | Implicitly derived index value | Value of the second index identifier | Transformation mode |
|---|---|---|---|
| First value | Second value | — | Nineth mode |
|  | First value | Second value | Tenth mode |
|  |  | First value | Eleventh mode |
| Second value | — | — | Twelfth mode. |

14. The video decoding apparatus according to claim 13, wherein the processor is further configured to execute the computer program instructions and perform:
  determining, for the encoding block, whether the transformation mode corresponding to the encoding block is jointly determined according to the implicitly derived index value and the explicit index identifier included in the encoding block; and
  in response to determining the transformation mode corresponding to the encoding block is jointly determined, performing the operation of determining a transformation mode of the encoding block according to the implicitly derived index value and a value of the explicit index identifier included in the encoding block.

15. The video decoding apparatus according to claim 14, wherein determining whether the transformation mode corresponding to the encoding block is jointly determined includes one or more of:
  an index identifier included in a sequence header of encoded data corresponding to a video image frame sequence, an index identifier included in an image header of encoded data corresponding to a video image frame, and a size of the encoding block.

16. The video decoding apparatus according to claim 13, wherein determining the implicitly derived index includes:
  determining the implicitly derived index value according to parity of the calculation result of the quantization coefficients.

17. The video decoding apparatus according to claim 13, wherein determining the implicitly derived index includes:
  calculating a remainder of the calculation result of the quantization coefficients for a set value; and
  determining the implicitly derived index value according to the remainder.

18. The video decoding apparatus according to claim 13, wherein calculating quantization coefficients includes:
  calculating a quantity of non-zero coefficients, even coefficients, non-zero even coefficients, or odd coefficients in the specified region in the quantized coefficient block, and using the quantity as the calculation result of the quantization coefficients.

19. The video decoding method according to claim 1, wherein:
  the first mode, the sixth mode, and the nineth mode are (DST7, DST7);
  the second mode, the seventh mode, and the tenth mode are (DCT8, DST7);
  the third mode and the fifth mode are SBT;
  the fourth mode, the eighth mode, and the twelfth mode are (DCT2, DCT2); and
  the eleventh mode is (DST7, DCT8).

* * * * *